Figure 1:
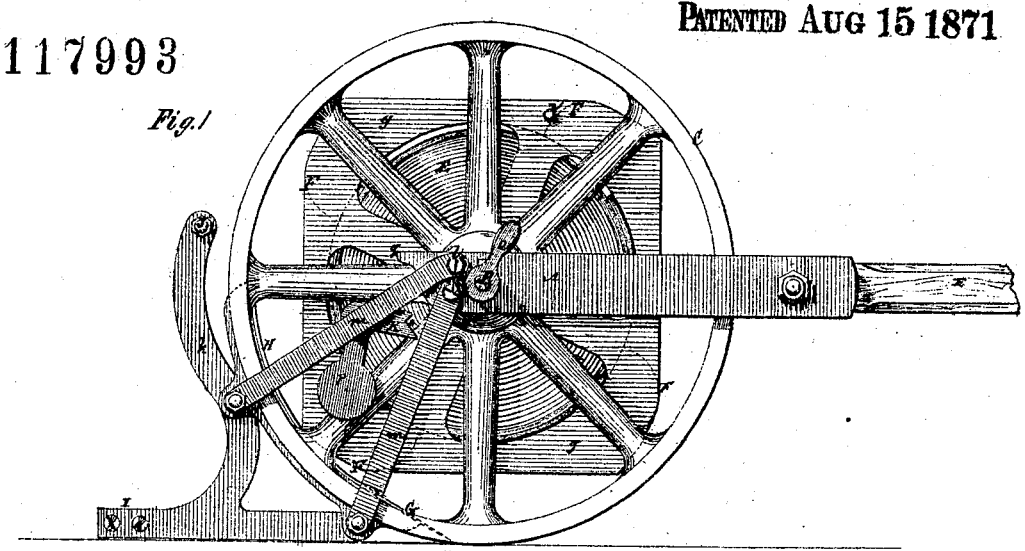

Robert W. Davis. Imp'ts in Excavating Machines. Sheet 1.
2 Sheets
No. 117993. PATENTED AUG 15 1871.

Witnesses:
Fred Haynes
R. J. Rabure

Robert W. Davis
Ben. Owen. Coombs
Attorneys

Robert W. Davis, Impts in Excavating Machines. Sheet 2
2 Sheets

117993

Witnesses.
Fred. Haynes
R. T. Rabun

Robert W. Davis
per Orson Coombs
Attorney

117,993

UNITED STATES PATENT OFFICE.

ROBERT W. DAVIS, OF SONORA, ASSIGNOR TO THE DAVIS EXCAVATOR COMPANY, OF BATH, NEW YORK.

IMPROVEMENT IN EXCAVATING-MACHINES.

Specification forming part of Letters Patent No. 117,993, dated August 15, 1871.

*To all whom it may concern:*

Be it known that I, ROBERT W. DAVIS, of Sonora, in the county of Steuben and State of New York, have invented certain new and useful Improvements in Excavating-Machines, of which the following is a full, clear, and exact description, reference being had to the accompanying drawing forming part of this specification.

This invention relates to that description of excavating-machines which partakes of the character of a self-loading dirt-cart for taking up and carrying away the dirt after it has been loosened by the pick, plow, or otherwise, thereby dispensing as far as possible with hand-digging and shoveling. It includes among its necessary elements a shovel, operating as a scraper, a central dirt-receptacle, and a revolving series of elevators, that, as the machine is drawn over the ground, gathers up the earth scraped up by the shovel, and, carrying it up over or against a back shield, which is an extension of the shovel, deposits it in the central receptacle, that is made capable of turning at intervals with the supporting-wheels of the vehicle to provide for the dumping of the load. The invention consists in an eccentric suspension, relatively to the elevators, of the shovel, or combined shovel and shield, with freedom to move up or down, and so that, as said shovel rises, it frees obstacles getting between the shovel and the elevators. This eccentric suspension of the scraper is preferably made at or from two points, whereby a perfect freeing action is attained for it both above and below. The invention likewise consists in a foot-board arranged in rear of the machine and attached to the suspended shovel, which foot-board serves as a standing place for the driver, and allows him to regulate, by taking off or throwing on his weight, the pressure of the shovel in the ground. The invention furthermore comprises a self-locking and unlocking pawl for keeping the shovel raised and letting it down accordingly as the machine is being used for excavating or being run over the ground free from any action of its excavating devices. The invention also comprises a friction-clutch for keeping the dirt-receptacle from turning while loading, but permitting it to turn in case of a stone or other obstacle getting in between any of the elevators and the forward edge of the mouth of said receptacle. This steady, but yielding, as contradistinguished from a positive, hold of the dirt-receptacle, in its receiving position, prevents breakage of parts. The invention likewise consists in a novel construction and arrangement of the device or devices by which the elevators may be conveniently and expeditiously put into or out of gear by the driver with the running or supporting-wheels of the machine; and the invention furthermore comprises a button or buttons on the elevators for catching on the dirt-receptacle to effect the dumping of the load when required.

Figure 2:
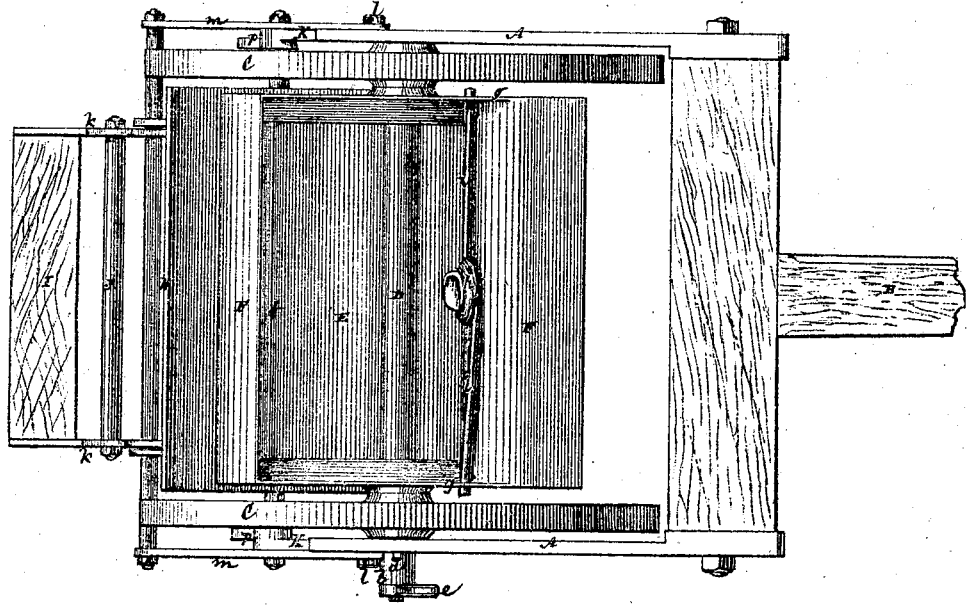
Figure 3:
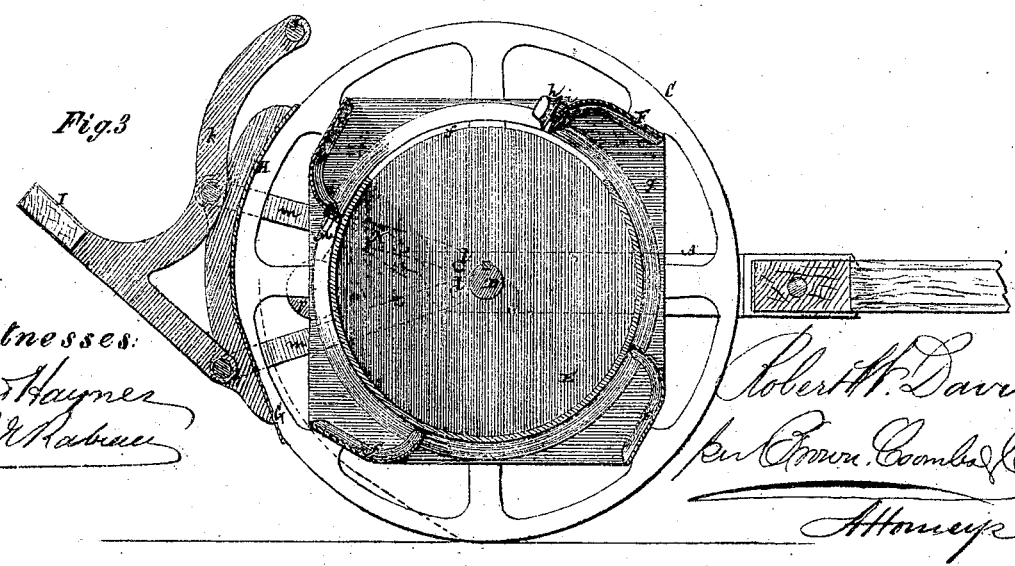
Figure 4:
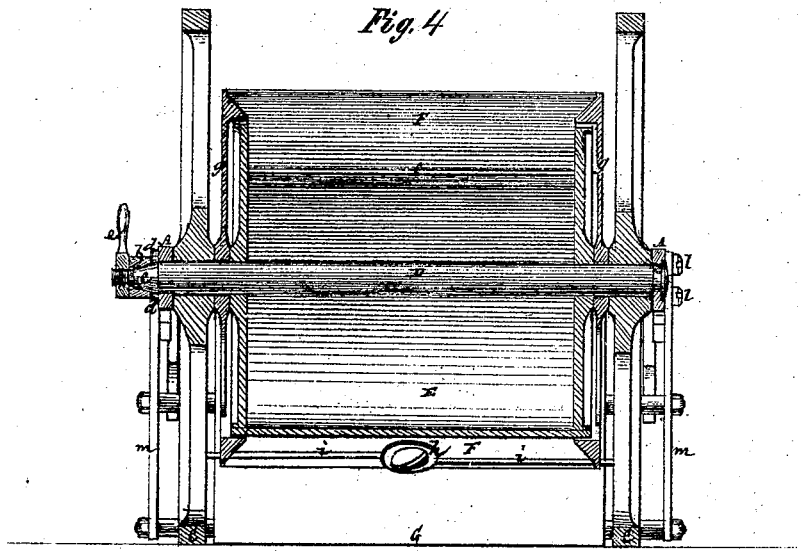
Figure 5:
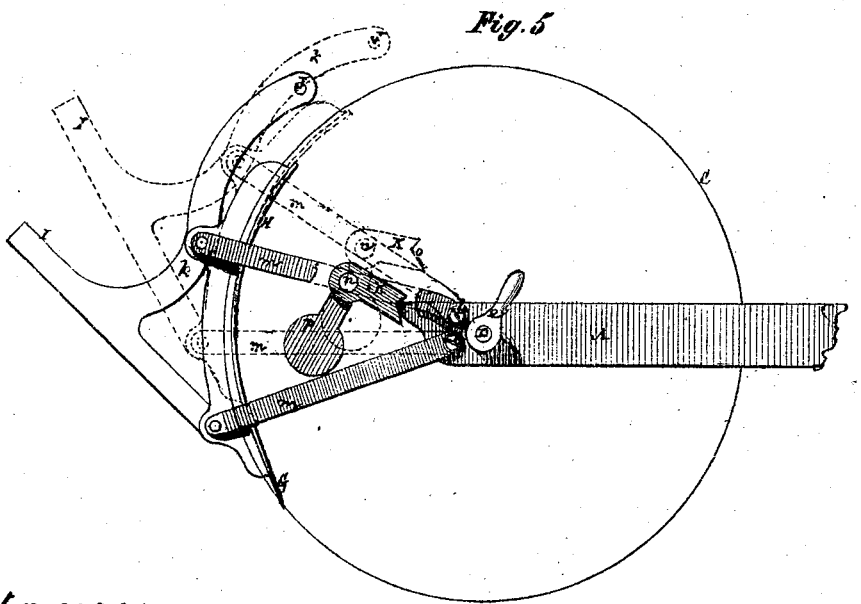

Having thus specified the object or objects and nature of the invention, its desciption will be proceeded with in reference to the accompanying drawing. Figure 1 represents a side elevation of an excavating-machine constructed in accordance with the invention; Fig. 2, a plan of the same. Fig. 3 represents a central vertical section taken longitudinally through the machine; Fig. 4, section at right angles to Fig. 3 of the same, in line with the main axle, and looking toward the rear of the machine; and Fig. 5, a side elevation of the machine in part, or diagram in illustration of the action of the pawl, which serves to hold the shovel and shield in a raised position and to liberate them when required.

Similar letters of reference indicate corresponding parts.

A represents the frame of the machine; B, its draft-bar or pole; and C C, the running or supporting-wheels thereof. D is the axle, on which the wheels C C are hung loose or free to revolve. Said axle is relatively, but not positively, stationary. Thus it is hung so as to be capable of turning in the side frames of the machine, but is restrained from rotating except when dumping the load, or when stones or other obstacles get in between any of the elevators and the forward edge of the mouth of the dirt-receptacle E, which latter is keyed fast to the axle. The means for thus holding the axle and dirt-receptacle E stationary with the mouth of the latter in an uppermost and receiving position, with freedom for the receptacle to yield and rotate under the above-named circumstances, consists of a friction-sleeve, *b*, fitted to receive within it a conical or tapering extension, *c*, of the main axle, and in gear with the side frame of the machine by means of a notch in the inner end of the sleeve, a projection, *d*, on the exterior of the frame A, entering said notch to prevent said sleeve from turning, but so that it is capable of having its frictional hold on the axle D increased or diminished by turning to the right or left a clamping-lever, $e$, arranged to screw onto the end of the axle and to bear on the friction-sleeve. This provides for a nice regulation of the hold of the dirt-receptacle in a yielding as contradistinguished from a positive manner. The dirt-receptacle E occupies a central position, and is preferably of circular form, and arranged in concentric relation with the axle, having a portion cut away to form a mouth, $f$. Arranged so as to be capable of free rotation on the axle D are a circular series of elevators, F, preferably of a bucket or scoop-like shape, which are connected by side arms or plates $g$, and by which they are supported on the axle. (See Figs. 1 and 4.) These elevators, which thus also occupy a concentric relation with the axle, travel when revolved in common with the running-wheels C C, by which they are driven when required to be rotated around in close proximity to the dirt-receptacle E. They are put into or out of gear with the wheels C C by means of an eccentric wrist-plate, $h$, arranged on the back of one or more of the elevators F, so as to be within convenient reach of the driver from the rear of the machine, and serving, accordingly as said plate is turned to the right or to the left, to project into or draw out of gear with said wheels or their arms rods $i$ $i$ hung so as to be capable of sliding in reverse transverse directions simultaneously. G is the shovel, having combined with it an upward, or upward and rear, extension, forming a shield or curb, H, within or in proximity to the front face of which the elevators F work in lifting the earth up into the dirt-receptacle E. The shovel G is straight, but the curb H, curved the same, being struck from the axle D as a center or thereabout, and so that, when the shovel is down to its place in or on the ground, said shield occupies a concentric position relatively with the elevators F, but when raised assumes an eccentric position thereto. By the straight construction of the shovel clearance is established for it, as shown in Fig. 1, for the elevators to pass over stones or obstacles forced up onto or lying thereon. It also insures for the shovel a better entry into or scraping action on the ground to collect the loosened earth. Said shovel, or combined shovel and shield, is hung so as to be capable of rising and falling, which not only allows of the shovel yielding or riding over bowlders, rocks, or other obstacles in the path of the machine likely to injure it without exposing the shovel to rise or slip away from its work when in operation on the loosened earth, partly by reason of the draft of the earth on the shovel in a reverse direction during the travel of the machine, and which tends to hold it down, and partly by the weight thrown upon the shovel by the driver, who stands upon a foot-board, I, attached to the shovel in its rear, and who, by stepping on or off the foot-board, can regulate the pressure of the shovel on the ground as required. There is also provided a cross-bar or handle, J, by which the driver can raise or lower the combined shovel and shield at pleasure, and which serves as a means for the driver to hold on by when standing on the foot-board. Said handle J and foot-board I are both carried by a frame or frames, $k$, arranged on the back of the combined shovel and shield. To provide for the eccentric swing of the combined shovel and shield, so that in rising it frees any obstacle getting in between it and the elevators, the same is hung or pivoted in an eccentric relation with the axle D by being attached to the frame of the machine on the rear side of said axle. To better provide for such clearance both above and below, said combined shovel and shield is hung from two points, $l$ $l$, on either side, as by radius-bars $m$ $m$. This top as well as bottom clearance will be readily seen by examining Fig. 3 of the drawing. The shovel is held in a raised position from the ground, and released to fall when required by the action of a self-locking and self-unlocking pawl, K, freely pivoted, as at $n$, to one of the radius-bars $m$, and notched at its end, as at $o$; also provided with a balance-weight, $p$, so that, when the combined shovel and shield is lifted by the handle J till the notched end $n$ of the pawl catches on a tooth-like projection, $q$, of the side frame, a firm hold is established for the shovel and shield in such raised position. When it is required to let the latter drop it is only necessary to slightly further elevate it so as to clear the pawl from the projection $q$, when said pawl, by its balance-weight, swings so that, on letting down the shovel and shield, the lower surface of the notched pawl strikes on the projection $q$ and rides over it free from engagement of the notch $o$. The action of this pawl is clearly represented in Fig. 5 of the drawing. The elevators F are so arranged as regards their distances apart and from the axle D, and the side arms or plates $g$ so shaped or cut away to somewhat of a rectangular form at their periphery, that said elevators, being independent of the wheels C C, as hereinbefore described, may be turned or adjusted on the axle to ride clear of the ground in running the machine to or from its work or at other times. The independence of the loose wheels C C provides, too, in a most efficient manner for the turning of the machine about at such or other times. Not only does the frictional attachment of the axle D and dirt-receptacle E to the frame of the machine, by means of the tapering extension $c$ of the said axle, the conical sleeve $b$, and the projection $d$ on the frame, provide for the elevators F and receptacle E moving in common in case of a stone or obstacle liable to produce injury getting in between the elevators and forward edge of the mouth $f$ of the receptacle, but on slackening the clamp or its lever $e$ ready provision is made for allowing of the inversion or free rotation of the dirt-receptacle when it is required to dump the load. Said receptacle E, when thus left at liberty to turn, may be automatically rotated in common with the elevators F by means of a button, M, provided on the back of one or more of the elevators, and within reach of the driver from the rear, said button, when adjusted in one position, working free of the dirt-receptacle, but when adjusted to a different position for dumping the same strikes on the forward edge of the mouth of the dirt-receptacle to rotate the latter in common with the elevators. (See Fig. 3.)

What is here claimed, and desired to be secured by Letters Patent, is—

1. The shovel, hung eccentrically in relation to the elevators, and so that, when rising, it frees obstacles getting in between it and the elevators, substantially as specified.

2. The shovel, hung eccentrically from two points, $l\ l$, in relation to the elevators, essentially as described.

3. The foot-board I, in combination with the rising-and-falling shovel G, essentially as described.

4. The combination of the self-locking and self-unlocking pawl K with the rising-and-falling shovel, substantially as specified.

5. The combination, with the axle D and dirt-receptacle E secured thereto, of a friction-clamp for holding in a yielding manner said receptacle from turning, and allowing of its free rotation when required, substantially as specified.

6. The gearing and ungearing device or plate $h$, with its rods $i\ i$ arranged on back of one or more of the elevators for operation with the wheels C C of the machine, essentially as herein set forth.

7. The dumping-button M, arranged on back of one or more of the elevators F, in combination with the dirt-receptacle E hung so as to be capable of rotation when required, substantially as specified.

ROBERT W. DAVIS.

Witnesses:
D. B. BRYAN,
H. SHERWOOD.